H. C. STOKES.
ATTACHMENT LEVER FOR BRAKE STAVES AND WHEELS.
APPLICATION FILED SEPT. 29, 1920.
1,375,238. Patented Apr. 19, 1921.
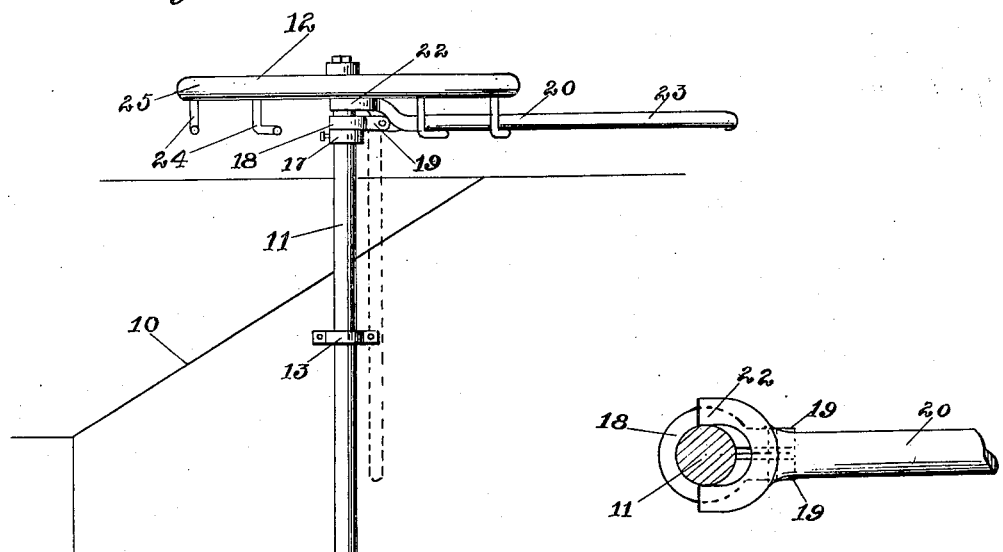
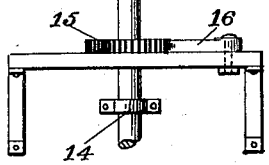
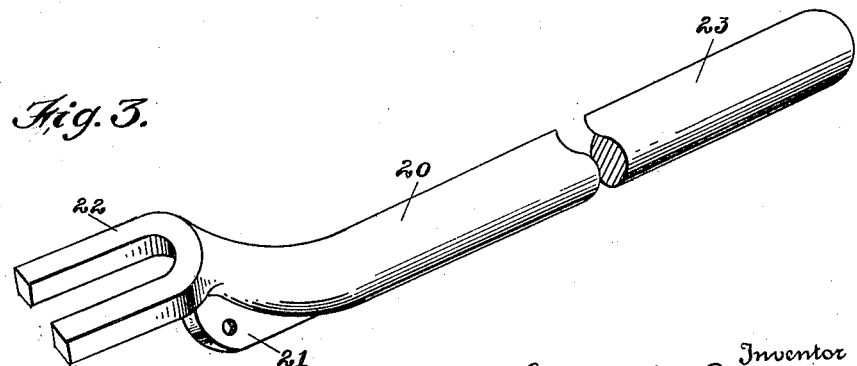

UNITED STATES PATENT OFFICE.

HENRY C. STOKES, OF SUMTER, SOUTH CAROLINA.

ATTACHMENT-LEVER FOR BRAKE STAVES AND WHEELS.

1,375,238. Specification of Letters Patent. Patented Apr. 19, 1921.

Application filed September 29, 1920. Serial No. 413,509.

*To all whom it may concern:*

Be it known that I, HENRY C. STOKES, a citizen of the United States, residing at Sumter, in the county of Sumter and State of South Carolina, have invented certain new and useful Improvements in Attachment-Levers for Brake Staves and Wheels, of which the following is a specification.

This invention relates to improved brake staff and wheel attachment levers, particularly adapted for use in connection with brakes on freight cars.

Details and objects of the invention will appear as described in connection with the accompanying drawings and hereinafter set forth and claimed.

Referring to the drawings forming a part of this specification, like numerals of reference designate corresponding parts in the three figures, in which, Figure 1 is an elevational view showing an application of my invention, Fig. 2 is a fragmentary plan view of the operating lever, and Fig. 3 is a perspective view thereof.

In Fig. 1 of the drawings, portion of a car 10 is illustrated in outline, and a brake staff 11 having a brake wheel 12 on its upper end is suitably journaled in bearing members 13 and 14 carried by the car. The brake staff carries the usual ratchet wheel 15 which is adapted to be engaged by a pawl member 16 in the usual manner.

In applying my invention to the brake staff 11 and wheel 12, a collar 17 is fastened to the brake staff so as to support a loose collar and bearing member 18.

As shown in Fig. 2, member 18, surrounding the brake staff, is provided with apertured projections 19, which are adapted to pivotally support an operating lever 20, by means of a pin passing through the apertures in the projections and an aperture in a reduced portion 21 of the lever. Thus the operating lever 20, when not in use, can hang down from the collar 18, as shown in dotted lines in Fig. 1.

The operating lever 20, has a bifurcated end 22, which, when the lever is in its operating position, engages the brake staff, and relieves the connection with the collar 18 from the strain which it would otherwise be under and increases the efficiency of the lever. The lever 20, extends to form a handle 23, and means for engaging the wheel 12, for turning it, which as illustrated in Fig. 1, may be a series of hooks 24, to be engaged by the lever, are fastened to or made integral with the rim, 25, of the wheel.

What I claim as my invention, and desire to secure by Letters Patent is:

1. A lever attachment for brake staves and wheels comprising a lever pivotally supported on a loose collar on the brake staff below the wheel, said lever having one end adapted to extend beyond the periphery of the brake wheel, means on its other end adapted to engage the brake staff, and means for connecting said lever with the wheel.

2. A lever attachment for brake staves and wheels including a collar adapted to be fastened to the brake staff, a loose collar mounted thereon above said first collar and having a pivot supporting means, a lever pivoted thereto adapted to extend beyond the periphery of the brake wheel having means for engaging the brake staff, and means for connecting said lever with the brake wheel.

3. A lever attachment for brake staves and wheels comprising a lever adapted to extend beyond the periphery of the wheel, a loose collar supported on the staff below the wheel to which said lever is pivoted, bifurcations on the end of said lever adjacent said pivotal connection for engaging said staff, and a series of hooks on the wheel rim for engaging said lever.

In testimony whereof I affix my signature.

HENRY C. STOKES.